(12) United States Patent
Mehas et al.

(10) Patent No.: US 7,928,787 B2
(45) Date of Patent: Apr. 19, 2011

(54) ENABLE PIN USING PROGRAMMABLE HYSTERESIS IMPROVEMENT

(75) Inventors: Gustavo J. Mehas, Mercer Island, WA (US); Chun Cheung, Seattle, WA (US); Brandon D. Day, Seattle, WA (US)

(73) Assignee: Intersil Americas Inc., Milpitas, CA (US)

( * ) Notice: Subject to any disclaimer, the term of this patent is extended or adjusted under 35 U.S.C. 154(b) by 9 days.

(21) Appl. No.: 10/917,628

(22) Filed: Aug. 13, 2004

(65) Prior Publication Data

US 2005/0206422 A1    Sep. 22, 2005

Related U.S. Application Data

(60) Provisional application No. 60/553,923, filed on Mar. 17, 2004.

(51) Int. Cl.
*H03K 3/00* (2006.01)

(52) U.S. Cl. .......................................... 327/205; 327/77

(58) Field of Classification Search .................. 327/77, 327/205–206
See application file for complete search history.

(56) References Cited

U.S. PATENT DOCUMENTS

| | | | | |
|---|---|---|---|---|
| 6,163,183 A * | 12/2000 | Azimi et al. | .................. | 327/142 |
| 6,316,978 B1 * | 11/2001 | Shacter | .......................... | 327/205 |
| 6,639,590 B2 * | 10/2003 | Takahashi et al. | ............. | 345/211 |
| 6,643,145 B1 * | 11/2003 | Harrison | .......................... | 363/16 |
| 2003/0202379 A1 * | 10/2003 | Yoshimura | ............... | 365/185.18 |
| 2004/0100240 A1 * | 5/2004 | Natsume et al. | ............... | 323/282 |

* cited by examiner

*Primary Examiner* — Quan Tra
(74) *Attorney, Agent, or Firm* — Howison & Arnott, LLP

(57) ABSTRACT

An apparatus for providing programmable hysteresis control using an enable pin of a device is disclosed. An enable pin is configured to receive an input signal to enable and disable an associated device responsive to the input signal. A current sink is attached to the enable pin and is responsive to circuitry that disables the current sink responsive to application of the input signal at a first voltage level and enables the current sink responsive to application of the input signal at a second voltage level.

6 Claims, 2 Drawing Sheets

ENABLE PIN USING PROGRAMMABLE HYSTERESIS IMPROVEMENT

CROSS-REFERENCE TO RELATED APPLICATIONS

This application claims priority from U.S. Provisional Patent Application Ser. No. 60/553,923 entitled "PROGRAMMABLE HYSTERESIS IMPROVEMENT" filed on Mar. 17, 2004.

TECHNICAL FIELD OF THE INVENTION

The present invention relates to DC-DC converters, and more particularly, to an enable pin of a DC-DC converter or similar device.

BACKGROUND OF THE INVENTION

The enable pin of a DC-DC converter or other type of device may be used for voltage monitoring in some applications. Existing designs establish a precision threshold with which to enable a DC-DC converter or similar device given a particular application requirement. Prior art designs use a current source that sources current into the enable pin after logical assertion of the enable signal to the enable pin to provide hysteresis control. However, in certain applications, a current source may not be used because the enable pin is being multiplexed to perform other functions. In one example, the enable pin may be utilized to activate a test/trim mode. If a positive current source were applied to the enable pin in these circumstances, a parasitic diode would result that would prevent the enable pin from being used to activate the test/trim mode. Thus, there is a need to establish some other manner for establishing a hysteresis magnitude that does not require the application of a current source to the enable pin.

SUMMARY OF THE INVENTION

The present invention disclosed and claimed herein, in one aspect thereof, comprises an apparatus for providing programmable hysteresis control within a device. An enable pin of the device is configured to receive an input signal that enables or disables the associated device responsive to the input signal. A current source is attached to the enable pin as the current sink. The current source is responsive to control circuitry that disables the current sink responsive to application of the input signal at a first voltage level to the enable pin and enables the current sink responsive to application of the input voltage at a second level to the enable pin.

DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
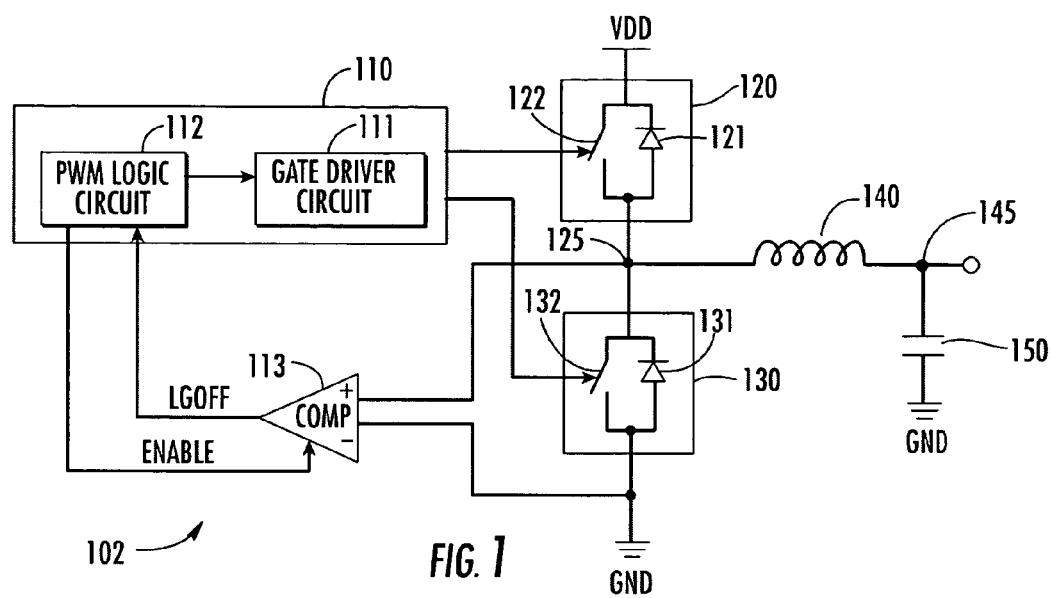
FIG. 1 is a block diagram of a DC-DC converter in which the enable pin design of the present disclosure may be implemented.

Referring now to the drawings, and more particularly to FIG. 1, wherein there is illustrated the general circuit configuration of a conventional DC-DC voltage converter as comprising a DC-DC controller, which fully controls the turn on and turn off of a pair of electronic switching devices, respectively, shown as an upper FET pass element 120 and a lower FET pass element 130. These FET switching devices have their drain/source paths coupled in between first and second reference voltages $V_{DD}$ and ground (GND). Each pass element contains a controllable switch shown as an upper switch 122 and a lower switch 132. The upper pass element contains a body diode 121 in parallel with the drain/source path such that the reverse current flows through the diode body toward $V_{DD}$. A lower pass element 130 contains a body diode 131 in parallel with the drain/source path such that the reverse current flows through the body diode from ground. A common or phase voltage 125 between the two power FETs 120/130 is coupled through an inductor 140 to a capacitor 150 coupled to a reference voltage (GND). The connection 145 between the inductor 140 and the capacitor 150 serves as an output node from which the output voltage VOUT is derived.

The DC-DC converter's controller 110 includes a gate driver circuit 111, that is operative to turn the two switching devices 120 and 130 on and off, in accordance with a periodic pulse wave form (typically, a pulse width modulation (PWM) switching wave form generated by a PWM logic circuit 112). The upper circuit 122 is turned on and off by an upper switch signal UG applied by the gate driver 111 to the gate of the pass element 120, and the lower switch 132 is turned on and off by a lower gate signal LG applied to the gate driver 111 to the gate of the pass element 130.

Figure 2:
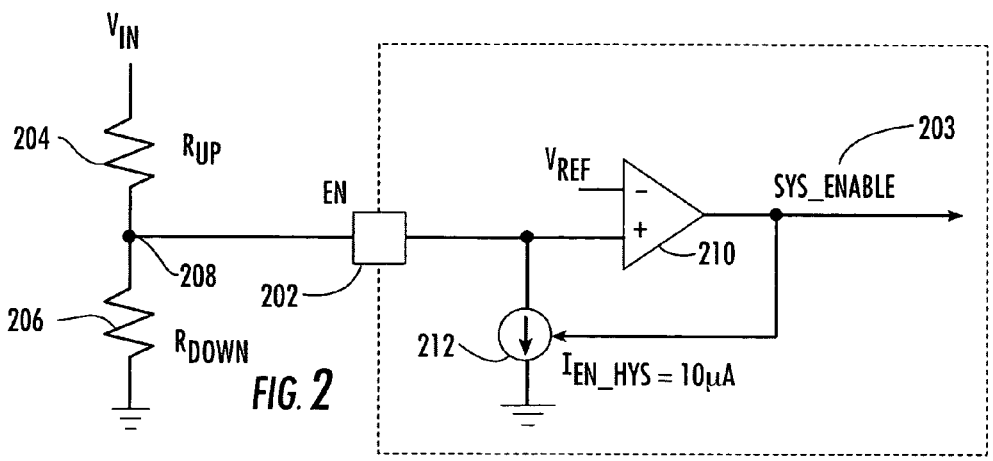
FIG. 2 is a schematic diagram of a circuit for providing hysteresis control according to the present invention.

FIG. 2 illustrates the manner in which an enable pin 202 associated with the DC-DC converter 102 of FIG. 1 may be configured to enable operation of the DC-DC converter 102 and provide hysteresis control. While the present description is made with respect to an enable pin of a DC-DC converter, any device having an enable pin may find this configuration useful. The enable pin 202 provides a SYS_ENABLE signal 203 to enable the DC-DC voltage converter 102. The enable pin 202, in addition to enabling the DC-DC voltage converter 102, may be used for other functions. These functions include voltage monitoring within the DC-DC converter 102 and activation of test/trim modes within the DC-DC converter 102. As discussed herein above, previous implementations have utilized a current source sourcing to the enable pin to set hysteresis magnitude and provide hysteresis control. However, this can create an undesired parasitic diode in certain applications.

The present embodiment includes a first resistor $R_{UP}$ 204 connected between an input voltage $V_{IN}$ and a node 208 connected to the enable pin 202. A second resistor $R_{DOWN}$ 206 is connected between node 208 and ground. The resistor pair $R_{UP}$ 204 and $R_{DOWN}$ 206 form a resistor divider network. The enable pin 202 is connected to a positive input of a comparator 210. The negative input of the comparator 210 is connected to a reference voltage $V_{REF}$ which enables comparison of the input voltage applied to the enable pin 202 to the reference voltage $V_{REF}$. A current source 212 is connected between the enable pin 102 and ground to act as a current sink. The current source 212 is responsive to the SYS_ENABLE signal 203 and is active when the enable pin is receiving a logical level for a disable signal that disables the DC-DC converter 102 and is inactive when the enable pin 102 is receiving a logical level for an enable signal for the DC-DC converter 102. This configuration enables the enable pin 202 to be used for controlling a programmable hysteresis when the enable pin 202 is being used for voltage monitoring.

While the input voltage $V_{IN}$ is ramping up to a targeted threshold voltage $V_{REF}$, the resistor divider network, consisting of resistor 104 and resistor 106, scales $V_{IN}$ to match the internal reference voltage $V_{REF}$ being applied to the negative input of the comparator 110. At the same time, the current source 112 is acting as a current sink and actively pulling down on the enable pin 102 to provide an additional voltage offset which is compensated for in the selection of the values $R_{UP}$ and $R_{DOWN}$ for resistors 104 and 106. The values of $R_{UP}$ and $R_{DOWN}$ may be determined according to the following equations:

$$R_{UP} = \frac{V_{EN\_HYS}}{I_{EN\_HYS}}$$

$$R_{DOWN} = \frac{R_{UP} * V_{EN\_REF}}{V_{EN\_FTH} - V_{EN\_REF}}$$

$$V_{EN\_FTH} = V_{EN\_RTH} - V_{EN\_HYS}$$

wherein:
$V_{EN\_HYS}$=a desired magnitude of hysteresis;
$V_{EN\_FTH}$=a desired falling voltage trip point;
$V_{EN\_RTH}$=an enable rising threshold; and
$I_{EN\_HYS}$=the value of the current provided by current source 112.

When the input voltage $V_{IN}$ causes the voltage applied to the enable pin 202 to exceed the reference voltage $V_{REF}$, the comparator 210 provides a logic signal at a first level that deactivates the current source 212 and enables the DC-DC voltage regulator. The deactivation of the current source 212 causes the voltage on the enable pin 202 to increase, thus adding positive feedback hysteresis to the DC-DC voltage converter 102 and improves input noise immunity.

When the input voltage $V_{IN}$ causes the voltage applied to the enable pin 202 to decrease to a voltage level lower than the reference voltage $V_{REF}$ threshold, the comparator 210 provides a logic signal at a second level that activates the current source 212. Provision of the logic signal at the second level by the comparator 210 will also deactivate the associated DC-DC voltage converter 102. When the current source 212 activates, the voltage level on the enable pin 102 is pulled even lower and adds positive feedback hysteresis to the system.

Figure 3:
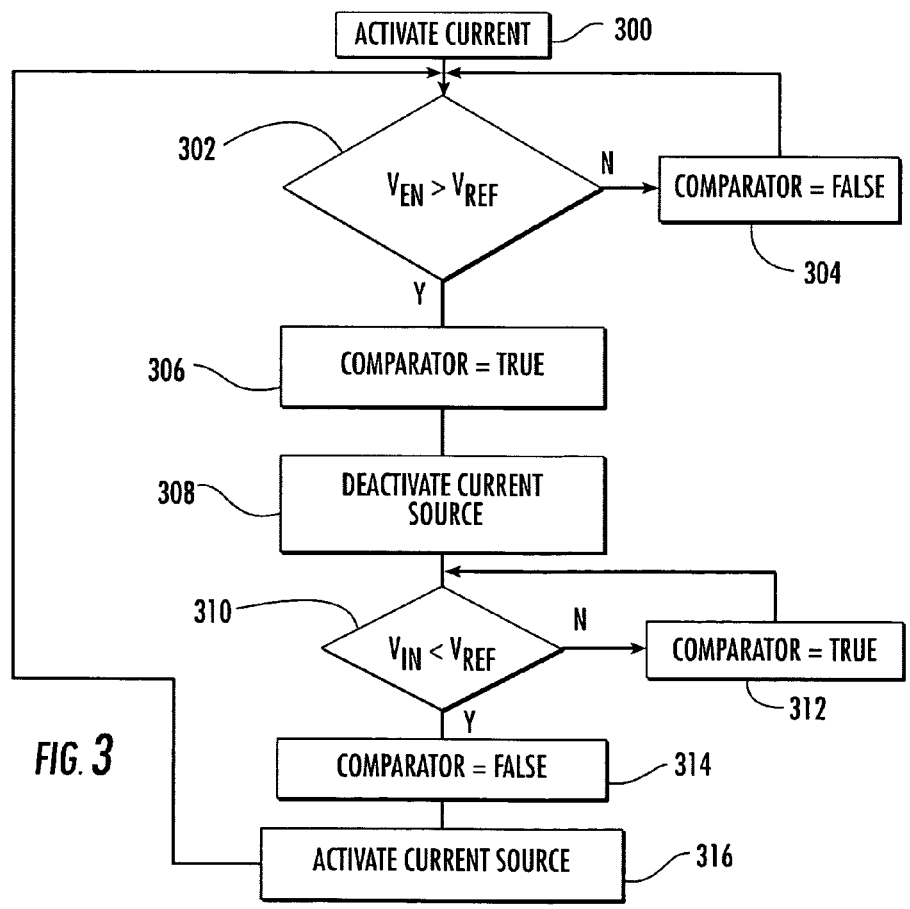
FIG. 3 is a flow diagram illustrating the operation of the circuit of FIG. 2.

Referring now to FIG. 3, there is illustrated a flow diagram describing the manner in which the circuit of FIG. 2 operates. Initially, the enable pin 202 is provided with a logical disable signal at a selected voltage level, and the output of comparator 210 will provide a false signal, causing the current source 212 to be activated at step 300. Inquiry step 302 determines whether the voltage applied at the enable pin 202 exceeds the reference voltage $V_{REF}$. If the reference voltage $V_{REF}$ is greater than the voltage on the enable pin 202, the comparator 210 continues to provide a logical false signal at step 304. When the enable pin voltage exceeds the reference voltage $V_{REF}$, the comparator 210 asserts a logical true signal at step 306. Assertion of the logical true signal at step 306 causes the current source 212 to be deactivated at step 308.

Once the current source 212 has been deactivated, inquiry step 310 determines if the enable pin voltage is less than the reference voltage $V_{REF}$ at the comparator 210. If the enable pin voltage is not less than the reference voltage $V_{REF}$, the comparator 210 output continues asserting a logical true signal at step 312. When the enable pin voltage drops below the reference voltage $V_{IN}$, the comparator 210 will assert a logical false signal at step 314. The logical false signal asserted by the comparator 210 causes the current source 212 to be activated at step 316. Once the current source 212 is activated at step 316, control returns to step 302.

Using the above-described configuration, the enable pin 202 may be used for additional purposes, such as multiplexing the enable pin 202 functionality to activate a test/trim mode. This configuration is distinct from existing designs which have the current source initially on and deactivate the current source after assertion of the enable pin to provide a programmable hysteresis functionality.

Although the preferred embodiment has been described in detail, it should be understood that various changes, substitutions and alterations can be made therein without departing from the spirit and scope of the invention as defined by the appended claims.

What is claimed is:

1. A DC-DC voltage converter package comprising:
a DC-DC voltage converter circuitry;
an enable pin for receiving an external voltage signal to enable and disable the DC-DC voltage converter circuitry responsive to the external voltage signal;
a comparator within the DC-DC voltage converter package for comparing the external voltage signal to a reference voltage signal, the comparator having an inverting input connected to receive the reference voltage signal and the non-inverting input connected directly to the enable pin;
a constant current source for providing a constant current sink over a variety of operating conditions connected directly to the enable pin within the DC-DC voltage converter package and the non-inverting input of the comparator and actively pulling down a voltage on the enable pin of the DC-DC voltage converter circuitry in a second mode of operation, wherein the constant current source is enabled in the second mode of operation and disabled in a first mode of operation;
a resistor divider network connected to the enable pin, the resistor divider including a first resistor connected between the external voltage signal and the enable pin and a second resistor connected between the enable pin and ground, the resistor divider network enabling programming of an amount of positive hysteresis and negative hysteresis;
wherein the comparator generates a control signal at a logical "high" voltage level for disabling the current sink and enabling the DC-DC voltage converter circuitry in the first mode of operation if the input voltage signal is greater than the reference voltage signal and generates the control signal at a logical "low" voltage level for enabling the current sink and disabling the DC-DC voltage converter circuitry in the second mode of operation if the input voltage signal is less than the reference signal;
wherein the current sink actively pulls down the voltage on the enable pin to provide an additional voltage offset at the enable pin in the second mode of operation adding negative feedback hysteresis; and
wherein deactivation of the current source in the first mode of operation increases the voltage on the enable pin adding positive hysteresis.

2. The apparatus of claim 1 further including the resistor divider network connected between the input signal and the enable pin.

3. A method for providing programmable hysteresis control to a DC/DC voltage converter package, comprising the steps of:
receiving an input signal at an enable pin of the DC/DC voltage converter package, the input signal for enabling and disabling a DC/DC converter;
comparing the input signal received at the enable pin to a reference signal;

generating within the DC/DC voltage converter package a control signal at a logical "low" voltage level if the input signal is less than the reference signal and at a logical "high" voltage level if the input signal is greater than the reference signal;

enabling a constant current source connected to the enable pin responsive to the control signal at the logical "low" voltage level;

actively pulling down a voltage at the enable pin responsive to enabling the constant current source to provide negative feedback hysteresis to the enable pin;

disabling the DC/DC converter within the DC/DC voltage converter package responsive to the control signal at the logical "low" voltage level;

disabling the constant current source connected to the enable pin responsive to the control signal at the logical "high" voltage level; and increasing the voltage at the enable pin responsive to disabling the constant current source to provide positive feedback hysteresis to the enable pin;

enabling the DC/DC converter responsive to the control signal at the logical high voltage level; and multiplexing the enable pin for at least one of voltage monitoring within the DC/DC converter or activating test/trim modes within the DC/DC converter when the DC/DC converter is enabled and the constant current source is disabled and the input signal remains above the reference signal.

4. An integrated circuit device package, comprising:

a DC/DC voltage converter circuitry;

an enable pin for receiving an input signal to enable and disable the DC/DC converter circuitry responsive to the input signal;

a comparator within the DC-DC voltage converter package for comparing the external voltage signal to a reference voltage signal, the comparator having an inverting input connected to receive the reference voltage signal and the non-inverting input connected directly to the enable pin;

a constant current source for providing a constant current sink connected directly to the enable pin within the integrated circuit device package and the non-inverting input of the comparator and actively pulling down a voltage on the enable pin of the DC/DC converter circuitry, wherein the constant current source is enabled in the second mode of operation and disabled in the second mode of operation;

a resistor divider network connected to the enable pin, the resistor divider including a first resistor connected between the external voltage signal and the enable pin and a second resistor connected between the enable pin and ground, the resistor divider network enabling programming of an amount of positive hysteresis and negative hysteresis;

wherein the comparator generates a control signal at a logical "high" voltage level for disabling the current sink and enabling the DC/DC converter circuitry in the first mode of operation if the input signal is greater than the reference signal and generates the control signal at the second voltage level for enabling the current sink and disabling the DC/DC converter circuitry in the logical "low" mode of operation if the input signal is less than the reference signal, wherein the enable pin is also multiplexed for alternative uses when the DC/DC converter circuitry is enabled and the current sink is disabled.

5. The apparatus of claim 4, wherein the enable pin may be multiplexed to perform the activation of test/trim modes within the DC/DC converter circuitry while the DC/DC converter circuitry is enabled.

6. The method of claim 3, further including the step of programming the negative feedback hysteresis and the positive feedback hysteresis to a desired level using a voltage divider circuit connected to the enable pin.

* * * * *